(12) United States Patent
Gao et al.

(10) Patent No.: US 12,735,837 B2
(45) Date of Patent: Sep. 15, 2026

(54) SYNCHRONOUS BELT FIBER TREATMENT AND BELT

(71) Applicant: GATES CORPORATION, Denver, CO (US)

(72) Inventors: Min Gao, Wuxi (CN); Guogong Chen, Suzhou City (CN); Kelechi C. Anyaogu, Sterling Heights, MI (US); Carol Weber, Englewood, CO (US)

(73) Assignee: Gates Corporation, Denver, CO (US)

( * ) Notice: Subject to any disclaimer, the term of this patent is extended or adjusted under 35 U.S.C. 154(b) by 834 days.

(21) Appl. No.: 17/890,240

(22) Filed: Aug. 17, 2022

(65) Prior Publication Data

US 2023/0059945 A1 Feb. 23, 2023

Related U.S. Application Data

(60) Provisional application No. 63/234,369, filed on Aug. 18, 2021.

(51) Int. Cl.
*D06M 11/73* (2006.01)
*C08K 3/04* (2006.01)
(Continued)

(52) U.S. Cl.
CPC ............ *D06M 11/73* (2013.01); *C09J 109/00* (2013.01); *C09J 133/08* (2013.01); *C09J 163/00* (2013.01);
(Continued)

(58) Field of Classification Search
CPC ...... D06M 11/73; D06M 11/76; D06M 15/55; D06M 15/693; D06M 2101/32;
(Continued)

(56) References Cited

U.S. PATENT DOCUMENTS

2017/0130014 A1* 5/2017 Anyaogu .................. F16G 5/08
2019/0376579 A1 12/2019 Wu et al.
(Continued)

OTHER PUBLICATIONS

Mail Stop PCT, Attn: ISA/US, Commisioner for Patents; Notification of Transmittal of The International Search Report And The Written Opinion Of The International Searching Authority; International Patent application No. PCT/US2022/040668; mailing date: Nov. 3, 2022.

(Continued)

*Primary Examiner* — David T Karst
(74) *Attorney, Agent, or Firm* — Kevin J. Aiken, Esq.

(57) ABSTRACT

Textile reinforced elastomeric composites having a textile reinforcement embedded in an elastomeric matrix. The textile reinforcement includes fibers or yarns and an adhesive treatment applied to the fibers wherein the adhesive treatment comprises graphene or graphene oxide. The textile reinforcement may be a fabric or a tensile cord. The fibers may be polyester, aramid, carbon fiber, glass fiber, PBO, PEN, or polyamide. The adhesive treatment may be an epoxy treatment, an epoxy-latex treatment, an acrylic polymer treatment, a latex treatment, a polyurethane treatment, an RFL treatment, a rubber cement, or combinations thereof. The composite may be in the form of a toothed belt wherein the textile reinforcement is a tooth cover or a helically wound tensile cord embedded in the belt.

9 Claims, 1 Drawing Sheet

(51) Int. Cl.

| | |
|---|---|
| ***C08K 7/02*** | (2006.01) |
| ***C09J 109/00*** | (2006.01) |
| ***C09J 133/08*** | (2006.01) |
| ***C09J 163/00*** | (2006.01) |
| ***C09J 175/04*** | (2006.01) |
| ***D06M 11/76*** | (2006.01) |
| ***D06M 15/55*** | (2006.01) |
| ***D06M 15/693*** | (2006.01) |
| ***D06M 101/32*** | (2006.01) |
| ***D06M 101/36*** | (2006.01) |
| ***D06M 101/40*** | (2006.01) |
| ***F16G 1/10*** | (2006.01) |
| ***F16G 1/28*** | (2006.01) |

(52) U.S. Cl.
CPC ............ *C09J 175/04* (2013.01); *D06M 11/76* (2013.01); *D06M 15/55* (2013.01); *D06M 15/693* (2013.01); *F16G 1/10* (2013.01); *F16G 1/28* (2013.01); *C08K 3/042* (2017.05); *C08K 7/02* (2013.01); *D06M 2101/32* (2013.01); *D06M 2101/36* (2013.01); *D06M 2101/40* (2013.01); *D06M 2200/00* (2013.01)

(58) Field of Classification Search
CPC ......... D06M 2101/36; D06M 2101/40; D06M 2200/00; C09J 109/00; C09J 133/08; C09J 163/00; C09J 175/04; F16G 1/10; F16G 1/28; C08K 3/042; C08K 7/02
USPC .......................................................... 525/65
See application file for complete search history.

(56) References Cited

U.S. PATENT DOCUMENTS

2019/0390047 A1 12/2019 Ozaki et al.
2020/0232540 A1 7/2020 Ikegami et al.
2020/0262988 A1 8/2020 Anyaogu et al.

OTHER PUBLICATIONS

Zhao et al., Enhancement of interlaminar fracture toughness in textile-reinforced epoxy composites with polyamide 6/graphene oxide interlaminar toughening tackifier, Composites Science and Technology, Feb. 23, 2020, pp. 1-10, vol. 191; entire document Jean-Emile Potaufeux, et al., "A comprehensive review of the structures and properties of ionic polymeric materials," Polym. Chem., 2020, vol. 11, pp. 5914-5936.

* cited by examiner

SYNCHRONOUS BELT FIBER TREATMENT AND BELT

REFERENCE TO RELATED APPLICATIONS

This application claims the benefits of U.S. Provisional Application No. 63/234,369, filed Aug. 18, 2021, the contents of which are hereby incorporated in their entirety.

Reference is made to application Ser. No. 63/234,370, titled "Synchronous Belt Fabric Treatment and Belt," filed by the applicant of this application Aug. 18, 2021, the entire contents of which are hereby incorporated herein by reference.

BACKGROUND OF THE INVENTION

This invention relates generally to a surface treatment for a fiber or yarn used in a tooth fabric or tensile cord embedded in a synchronous belt, more particularly to an adhesion treatment containing graphene.

Synchronous belts (also known as timing belts or toothed belts or positive drive belts) are widely used in power transmission applications requiring accurate timing or synchronization between driven and driver components. Synchronous belts generally have a body of flexible elastomeric material with inextensible tensile members or tensile cords embedded therein. On at least one side of the belt are evenly spaced transverse teeth, designed to mate with grooved sprockets in a drive system. The teeth or toothed surface are generally covered with a tooth covering fabric. The fabric may be treated with an adhesive such as an RFL (resorcinol-formaldehyde-latex) or a rubber composition for improved adhesion to the belt body and/or for improved surface frictional characteristic, wear resistance, or environmental resistance. Additional, external coatings have also been proposed for changing frictional behavior, wear resistance or environmental resistance. A treated fabric suitable for use as a tooth covering will herein be called a "jacket" to distinguish it from the untreated fabric. Further improvements in adhesion of timing belt fabrics and jackets are desirable.

Toothed belts also generally include an inextensible tensile member which prevents the tooth pitch (i.e., the spacing between teeth or from tooth to tooth) from growing under tensile load. The inextensible tensile members are often twisted cords of fiber glass, carbon fiber, aramid fiber, metal wire, PBO (polybenzobisoxazole), or hybrids thereof. The tensile members are also generally impregnated and/or coated with one or more adhesive treatments for improved adhesion to the belt body. Improvements in tensile member adhesion are also desirable.

Graphene is a sheet form of carbon. It is primarily, almost entirely or entirely, fully exfoliated single sheets of graphite or partially exfoliated graphite sheets, in which two or more sheets of graphite have not been exfoliated from each other. Thus graphene sheets can be a mixture of fully and partially exfoliated graphite sheets. Graphene may have a surface area of at least about 100 $m^2/g$ to about 2,630 $m^2/g$.

Graphene is reported in U.S. Pat. Pub. No. 2016/0194475A1 to reinforce polymer fibers when blended into the polymer from which the fibers are made.

Graphene is reported in JP2018/017398A to provide lubrication (reduced coefficient of friction) and abrasion resistance to the contact surface of a belt when used in a surface coating on the belt jacket. The binder is preferably a vulcanized rubber the same as or similar to the belt body and preferably applied to one side of a fabric. JP2018/017398A discloses a toothed belt with a fabric cover with a frictioned, rubber coating on the outside including binder, filler, and graphene. The fabric cover may be pretreated with RFL, epoxy or other composition before applying the graphene/binder composition to the one side.

JP2018/004080A discloses that graphene is effective in reducing surface coefficient of friction on V-belts when added to the rubber composition present at the surface.

Methods of making compositions comprising graphene sheets dispersed in a solvent for use in polymers compositions and fibers are described in U.S. Pat. Pub. No. 2016/0115293A1, the contents of which relating to graphene and methods of making useful graphene dispersions for incorporation into other material formulations are hereby incorporated herein by reference.

SUMMARY OF THE INVENTION

The present invention is directed to systems and methods which provide treatments for textile-reinforced rubber composites, such as the fabric covering toothed belts or tensile member fibers for toothed belts, or which provides fibers with improved adhesion to rubber. The invention is also directed to systems and methods which provide treatments for tensile members of toothed belts with improved adhesion to belt body materials. The invention may include other types of power transmission or transport belts using jackets or cords, such as V-belts, multi-V-ribbed belts, flat belts, round belts, and the like, or textile reinforced hose.

The invention relates to textile reinforced elastomeric composites having a textile reinforcement embedded in an elastomeric matrix. The textile reinforcement includes fibers or yarns and an adhesive treatment applied to the fibers wherein the adhesive treatment comprises graphene or graphene oxide.

The textile reinforcement may be a fabric or a tensile cord. The fibers may be polyester, aramid, carbon fiber, glass fiber, PBO, PEN, or polyamide.

The adhesive treatment may be an epoxy treatment, an epoxy-latex treatment, an acrylic polymer treatment, a latex treatment, a polyurethane treatment, an RFL treatment, a rubber cement, or combinations thereof.

The composite may be in the form of a toothed belt wherein the textile reinforcement is a tooth cover or a helically wound tensile cord embedded in the belt.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form part of the specification in which like numerals designate like parts, illustrate embodiments of the present invention and together with the description, serve to explain the principles of the invention. In the drawings.

DETAILED DESCRIPTION

Figure 1:
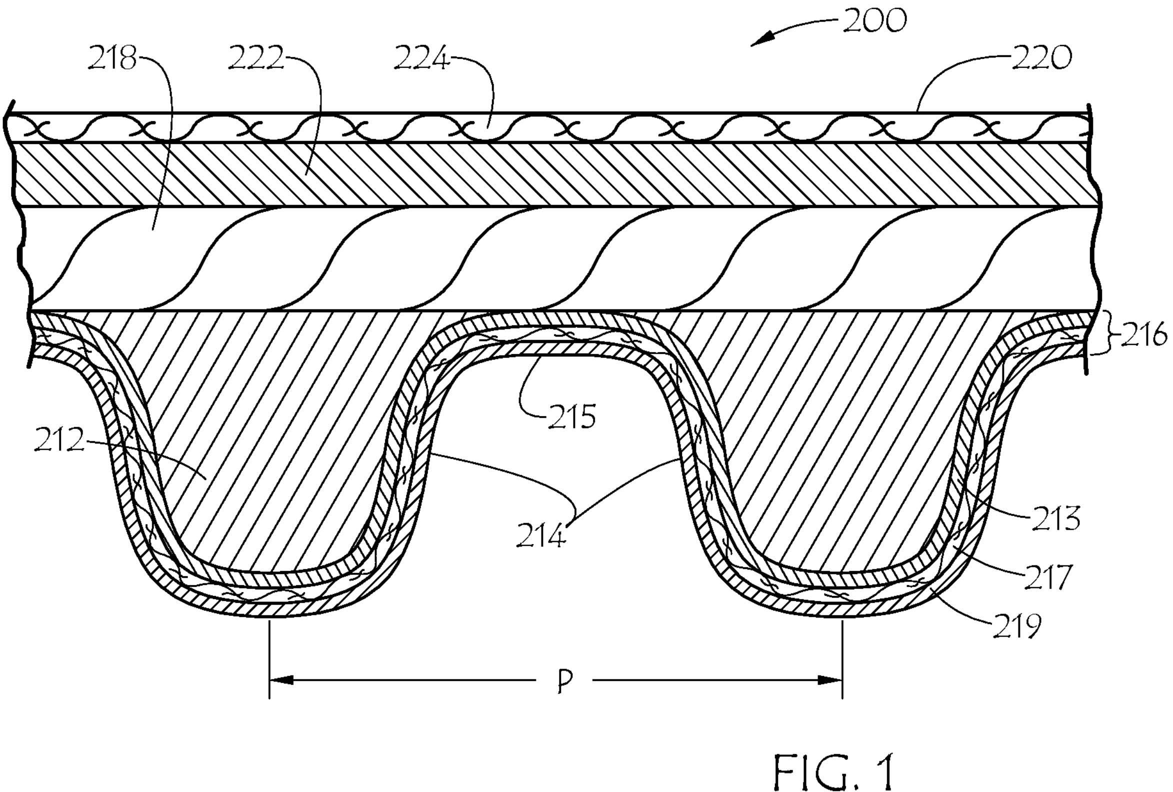
FIG. 1 is a partially fragmented side view of a timing belt according to an embodiment of the invention.

Adding graphene to a textile or fiber adhesive or fiber surface treatment such as epoxy/latex or RFL has now been found to increase adhesion. Graphene has lubricious properties and has been used to improve wear resistance on wear surfaces, but simultaneous adhesion improvement is a surprise. Most lubricious additives reduce adhesion.

Graphene Description

Graphene is a nanomaterial consisting of single layer sheets of carbon atoms in a hexagonal arrangement. Graphene is an allotrope of carbon in the form of a two-dimensional, atomic-scale, hexagonal lattice in which one atom forms each vertex. It is the basic structural element of other allotropes, including graphite, charcoal, carbon nanotubes and fullerenes. It may be considered as an indefinitely large aromatic molecule, the ultimate case of the family of flat polycyclic aromatic hydrocarbons. Graphene nanoplatelets are available as high purity, low defect, ultrathin graphene particles of nanometer scale thickness. They can also be short stacks of single-layer graphite sheets. They are generally made by proprietary manufacturing processes. They are produced in several grades and sizes.

Graphene oxide (GO) is an oxidized form of graphene with hydroxy, epoxy, and/or carboxylic functional groups attached to the carbon network. GO maintains the structural properties of non-functionalized graphene and may be expected to exhibit better chemical reactivity and dispersibility in water due to the hydrophilic oxygen groups. Nevertheless, herein, when "graphene" is mentioned, non-functionalized graphene is meant, and "graphene oxide" or "GO" will be used for clarity when appropriate.

Commercial graphene and GO powders and dispersions are available with varying sheet thickness, lateral dimension and functionalization. Exemplary graphenes for practicing the invention include various grades of xGnP® Graphene Nanoplatelets from XG Sciences, Inc., and various grades of graphene and graphene oxide powders and dispersions available from Global Graphene Group, Graphene Supermarket, Sixth Element, and many other suppliers.

Here, we use water-based graphene added to an adhesive coating system for textile treatment. The textile may be a tensile cord or a fabric. Surprisingly, it is possible to for such a treatment to improve both fabric wear resistance on the outside and adhesion to the rubber compound on the inside of a composite article like a power transmission belt.

Coatings:

The adhesive coating to which the graphene is added may be an RFL, a rubber cement, an acrylic-based coating, or an epoxy-based coating such as an Epoxy-Latex coating, as non-limiting examples. The coating may include other forms of carbon, such as carbon black, graphite, nanostructured carbon, or the like, as well as any needed curatives, surfactants, colorants, anti-degradants or other conventional ingredients.

The tensile cord or fabric may be embedded in a rubber material or further rubberized with conventional adhesives and/or rubber coatings.

An exemplary epoxy-latex treatment is described in U.S. Pat. Pub. No. 2014/0080647 A1, published Mar. 20, 2014, hereby incorporated herein by reference. That publication discloses a toothed belt with a belt body that includes teeth on one surface side thereof, and a facing fabric which has been treated with a hardened material of a first epoxy resin. Alternately, the facing fabric is treated with a treatment agent composition including a second epoxy resin, a second hardener for hardening the second epoxy resin, and a rubber component. According to embodiments of this invention, graphene may be added to such epoxy or epoxy-rubber fabric treatments and coated on the fibers of a fabric to improve adhesion of the fabric to rubber belt bodies or rubber top coatings on the treated fabric.

Another exemplary adhesive system is described in U.S. Pat. Pub. No. 2017/0130014 A1, published May 11, 2017. The system is aqueous and may also benefit from the addition of powdered or dispersed graphene or GO.

RFL adhesives are well-known to those of skill in the art and will not therefore be described in detail here.

It should be noted that the adhesion improvement implies that the treated fibers are embedded in a matrix, generally of rubber. Thus the improved adhesion is between the fibers and the matrix, as a result of the intervening coating which includes the graphene or graphene oxide. An additional benefit may appear in cases where abrasion exposes the fibers. An example of such a case is in power transmission belts where the fiber is embedded or covered by a rubber layer which may eventually wear off, exposing the treated fibers. In those cases, the addition of graphene or graphene oxide to the primary fiber coating or treatment may improve abrasion resistance once the matrix is worn away.

The construction of a timing belt according to the invention is illustrated in FIG. 1. It should be understood that only a portion of the endless belt is shown in FIG. 1. Belt 200 includes teeth 214 on one side, which engage grooved sprockets or grooved pulleys. The teeth 214 alternate with lands 215. The curved transition from the flank of tooth 214 to land 215 is called the root or the tooth root. The belt 200 has a smooth back side 220, although an alternate embodiment may have similar teeth on both sides. The body rubber or elastomer includes tooth rubber 212 and back rubber 222. The toothed side is covered with tooth jacket 216 and the back side 220 is covered with back jacket 224. The tooth repeat length is called the pitch, "P." The tensile member 218 is embedded in the belt body rubber and gives the belt its high modulus in tension. The tensile member 218 may include one or more fiber adhesive treatments which may include graphene or graphene oxide according to embodiments of the invention.

The tooth jacket 216 includes a fabric 217, surface rubber layer 219, and one or more additional fabric treatments, such as adhesion layer 213, to enhance one or more belt properties, for example, adhesion, oil resistance, wear resistance, and the like, as well as system performance properties such as timing error and durability. One or more of the fiber treatments comprises graphene or graphene oxide according to embodiments of the invention. Likewise, the back jacket 224 may include a fabric and one or more of the same or different treatments as the tooth jacket. The term "jacket" is thus used to describe a fabric with one or more treatments included which is generally the form in which it is ready for assembly into the belt or other rubber composite article.

"Fabric" generally refers to the greige woven, non-woven, or knit material before applying treatments.

Fabric Examples

The examples that follow illustrate the use of graphene and graphene oxide in various coatings for various belt textiles, such as cover fabrics and tensile cords, to improve adhesion.

In a first example, synchronous belt jackets were prepared using an aramid/nylon fabric treated with an epoxy-latex treatment, as described in US 2014/0080647 A1. The epoxy-latex coating was modified to include graphene, which was then compared to the unmodified control coating. The graphene used was GP1201, from The Sixth Element (Changzhou) Materials Technology Co., Ltd. GP1201 is a 5%-solids, water-based dispersion, with pH of 7-8, and viscosity of ≤3000 mPa·s, having an average particle size of ≤6 μm (D50).

TABLE 1 shows the four epoxy-latex dip formulations used in the first example. The control dip had no graphene. Dips A, B, and C had increasing levels of graphene GN1201 as indicated in the table. The dips were applied onto a modified-plain-woven fabric having a mixture of aramid and nylon fibers in both the warp and the weft and onto a twill woven fabric having para-aramid yarns and elastic yarn in the weft and meta-aramid yarn in the warp. Two methods were used to apply the dips. In a first dipping process, the fabric was dipped in the formulations for one minute, dried in air for 20 to 30 minutes, then baked in an oven for 20 minutes at 155° C. The dip pickup ranged from 17% to 22% by weight. The second method included a spraying process wherein dip C was sprayed onto the already-dipped fabric. After each spray application, the fabric was dried for about an hour. For some examples, the spray was applied to one side of the fabric in one or two coats after dipping. The final coated fabric was baked in an oven for 20 minutes at 120° C. The total pickup when dipping and spraying was combined was in the range from 33% to 44% by weight. Peel adhesion to two HNBR rubber formulations was tested. The test rubbers were a body rubber formulation and an adhesive cement rubber formulation, both of which are used for timing belts. All compositions are in weight percent unless otherwise noted.

Figure 2:
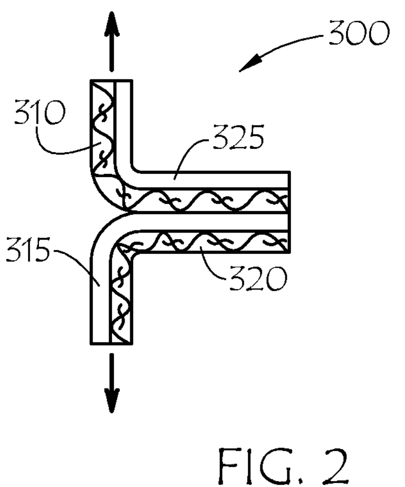
FIG. 2 is a schematic side view of a peel adhesion test.

FIG. 2 illustrates the peel adhesion test. The test specimen 300 includes at least two layers of rubber and two layers of the test fabric or jacket. The interface between jacket 310 and test rubber layer 315 is separated by pulling as indicated by the arrows. Jacket layer 320 stabilizes the test rubber layer 315 and rubber layer 325 stabilizes jacket 310 and facilitates gripping.

Timing belt fabrics such as those used in these experiments tend to have a rougher side and a smoother side. The rougher side is intended for bonding to the belt body, hopefully with better mechanical adhesion due to the roughness. The smoother side is intended for a pulley contact surface. There results in TABLE 2 indicate which side was tested for adhesion.

TABLE 2 shows the adhesion results with and without graphene. It appears that 0.1% graphene in the wet dip formulation, or 0.3% graphene on a dry basis, is approximately the lower limit for a positive effect on adhesion in this system. Generally, the adhesion improves both with the increase in graphene content and with an increase in the amount of dip on the fabric. Thus, the examples with both dip and spray (i.e., about 40% pickup) do better than dip only (i.e., about 20% pickup). The upper limit of usefulness depends on the ability to disperse the graphene in the dip. In these formulations it was found that levels of 1% (wet basis) or 6% dry basis graphene or graphene oxide tended to be unstable and the graphene or graphene oxide tended to settle out, leading to degraded performance.

A jacket comprising the aramid-only fabric dip coated with Dip B and sprayed with Dip C was chosen to make test belts for comparison with control belts based on the control dip. In both cases, the adhesion rubber was also applied to the jacket. As seen in TABLE 2, the peel adhesion for this fabric was 143 N/25 mm, a 17% improvement over the control. Peel testing on the belts showed the inventive jacket also had better adhesion than the control, namely 27% better peeling over the tooth and 45% better peeling over the land region. On a hot oil test rig where the belt runs partially immersed in a hot oil bath, the belt life of the inventive belt was 33% longer than the control belt. On a motored engine test rig, also with oil on the belt, the belt life was 27% longer than the control belt.

TABLE 1

| | | Control Dip | | Dip A | | Dip B | | Dip C | |
|---|---|---|---|---|---|---|---|---|---|
| Ingredient | Solid content (%) | Wet Wt. (g) | Dry Wt. (g) | Wet Wt. (g) | Dry Wt. (g) | Wet Wt. (g) | Dry Wt. (g) | Wet Wt. (g) | Dry Wt. (g) |
| Water | 0 | 428 | 0 | 424 | 0 | 416 | 0 | 407 | 0 |
| Epoxy resin | 100 | 70 | 70 | 70 | 70 | 70 | 70 | 70 | 70 |
| NBR Latex | 41 | 73.2 | 30 | 73.2 | 30 | 73.2 | 30 | 73.2 | 30 |
| Curing agent | 100 | 3.5 | 3.5 | 3.5 | 3.5 | 3.5 | 3.5 | 3.5 | 3.5 |
| Graphene | 8 | 0 | 0 | 7.22 | 0.58 | 21.9 | 1.75 | 36.9 | 2.96 |
| Total Weight | 18 | 574.7 | 103.5 | 577.9 | 104.1 | 584.6 | 105.3 | 590.6 | 106.5 |
| % graphene (Wt. %) | | 0 | 0 | 0.1 | 0.5 | 0.3 | 1.5 | 0.5 | 3.0 |

In a second example experiment, graphene oxide was used instead of graphene in the same dip formulation as in TABLE 1 above, i.e., at the same levels as in the above trial with graphene. The graphene oxide used was SAS-522 from the same supplier, in a water-based dispersion with 3.6% solids content. The same aramid/nylon blend fabric and belt body rubber were used for the adhesion tests. The pickup levels on the fabric were rather low, at 8 to 12%. Nevertheless, some adhesion improvement was observed with graphene oxide. Experiments at higher pickup levels were not carried out with GO, but they would be expected to show comparable results to the graphene experiments.

TABLE 2

| Peel adhesion results (N/25 mm) | | | Control | | | |
|---|---|---|---|---|---|---|
| Process | Fabric | Rubber | Dip | Dip A | Dip B | Dip C |
| Dip only | Aramid/nylon blend-rough side | Body | 86 | 90 | 107 | 111 |
| | | % improvement | — | 5% | 24% | 29% |
| Dip only | Aramid/nylon blend-smooth side | Body | 106 | 91 | 124 | 123 |
| | | % improvement | — | −14% | 17% | 16% |
| Dip + 2x C spray | Aramid/nylon blend-rough side | Adhesion | 64 | 68 | 85 | 110 |
| | | % improvement | — | 6% | 33% | 72% |
| Dip + 2x C spray | Aramid/nylon blend-smooth side | Adhesion | 62 | 63 | 79 | 111 |
| | | % improvement | — | 2% | 27% | 79% |
| Dip only | Aramid only-rough side | Body | 88 | 84 | 90 | 91 |
| | | % improvement | — | −5% | 2% | 3% |
| Dip + 2x C spray | Aramid only-rough side | Body | 116 | 111 | 128 | 129 |
| | | % improvement | — | −4% | 10% | 11% |
| Dip + 2x C spray | Aramid only-rough side | Adhesion | 122 | 116 | 143 | 136 |
| | | % improvement | — | −5% | 17% | 11% |

Tensile Cord Examples

An exemplary aqueous adhesive composition, as described in U.S. Pat. Pub. No. 2017/0130014 A1, was mixed on a wet weight basis consisting of 86.7% Ricobond® 7002 as the polyelectrolyte (30% solids), 4.8% Hydrosize EP834 from Michelman as the bisphenol A epoxy resin (60% solids), 0.7% Luperox® 101XL45 from Harwick as the peroxide curative (45% solids), and 7.8% additional distilled water. Graphene oxide reported to have a plate thickness of 2 nm and an average size of 554 nm was used. A net 15% solids formulation and a net 30% solids formulation were used as the controls. To each was added 0.05% GO and 0.1% GO on a final dry weight basis. Each of these six variables was then coated onto a carbon fiber tensile cord. A Chemlok 238 overcoat was applied and T-block adhesion specimens prepared using a conventional EPDM rubber composition for power transmission belts. On the average about a 10% improvement in adhesion was attributable to the GO, even at the very low levels used.

In an RFL experiment, a typical adhesive system used for polyester ("PET") cords and fabrics was modified with graphene. The control or benchmark system includes an optional primer directly on the fibers, then an RFL adhesive treatment, followed by an overcoat adhesive (Chemlok 238). In this series, graphene GP1201 was added to the overcoat only, to the RFL and the overcoat, and to the primer and the RFL. The amount added is indicated in TABLE 3 on a dry weight percent basis. A PET tape was coated with the treatments, dried, and then vulcanized in contact with an EPDM belt compound to make a peel adhesion test specimen. The peel test was run at 50 mm/min. The average of three peel adhesion test results are reported in TABLE 3 for the various combinations. On the average, the graphene improves adhesion 10% or more in most situations and uses.

TABLE 3

| | Treatment type and added Graphene (dry wt. %) | | | Average Peel | % |
|---|---|---|---|---|---|
| Example | Primer | RFL | Overcoat | (N/5 cm) | improved |
| Control 1-RFL + Overcoat | — | 0% | 0% | 230.3 | |
| Ex. 1.1 | — | 0% | +0.2% | 269.8 | 17% |
| Ex. 1.2 | — | 0% | +0.3% | 277 | 20% |
| Ex. 1.3 | — | 0% | +0.4% | 236.6 | 2.7% |
| Ex. 1.4 | — | +0.2% | +0.2% | 266.3 | 16% |
| Ex. 1.5 | — | +0.3% | +0.3% | 265 | 15% |
| Ex. 1.6 | — | +0.4% | +0.4% | 211.4 | −8% |
| Control 2-Primer + RFL + Overcoat | 0% | 0% | 0% | 230.3 | — |
| Ex. 2.1 | +0.2% | +0.2% | 0% | 265.4 | 15% |
| Ex. 2.2 | +0.3% | +0.3% | 0% | 245.7 | 7% |
| Ex. 2.3 | +0.4% | +0.4% | 0% | 266.4 | 16% |

Thus, in various embodiments, the adhesion of textiles to rubber in reinforced rubber composite articles may be improved by the adhesion of graphene or graphene oxide or other functionalized graphene to an existing adhesive formulation. The textiles may be fabrics or tensile cords. The fiber materials in the textiles may be, for example, polyester, aramid, carbon fiber, glass fiber, PBO, PEN, polyamide, or combinations thereof. The adhesive treatment may be an epoxy treatment, an epoxy-latex treatment, an acrylic polymer treatment, a latex treatment, a polyurethane treatment, an RFL treatment, a rubber cement, or combinations thereof. The adhesive treatment to which the graphene is added may be a first primer on the fiber, a primary adhesive, a secondary adhesive or overcoat, or any combination thereof. The rubber to which the textile is bonded may be any suitable rubber, including EPM or EPDM, NBR or HNBR, other ethylene-alpha-olefin rubbers, other diene rubbers, fluoroelastomers, acrylic rubbers, urethane elastomers, and others. Examples of the composite articles that may benefit include power transmission belts, conveyor or transport belts, hoses, air springs, and the like. The amount of graphene or graphene oxide added may be as low as 0.05%, or 0.1%, or 0.2%, or 0.5% on a dry weight basis. The amount of graphene or graphene oxide added may be as high as 6%, or 5%, or 3% or 1.5% on a dry weight basis.

Although the present invention and its advantages have been described in detail, it should be understood that various changes, substitutions, and alterations can be made herein without departing from the scope of the invention as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. The invention disclosed herein may suitably be practiced in the absence of any element that is not specifically disclosed herein.

What is claimed is:

1. A textile reinforced elastomeric composite comprising a textile reinforcement embedded in an elastomeric matrix, said textile reinforcement comprising fibers and an adhesive treatment applied to said fibers wherein said adhesive treatment comprises graphene or graphene oxide; wherein the adhesive treatment is selected from the group consisting of an epoxy-latex treatment, a latex treatment, an RFL treatment, a rubber cement, and combinations thereof; and wherein the adhesive treatment contains no polyelectrolyte.

2. The elastomeric composite of claim 1 wherein the textile reinforcement is a fabric comprising said fibers and said fabric is treated with said adhesive treatment.

3. The elastomeric composite of claim 1 wherein the textile reinforcement is a tensile cord comprising said fibers and said tensile cord is treated with said adhesive treatment.

4. The elastomeric composite of claim 3 wherein the tensile cord comprises fibers selected from the group consisting of polyester, aramid, carbon fiber, glass fiber, PBO, PEN, and polyamide.

5. The elastomeric composite of claim 1 in the form of a toothed belt wherein the textile reinforcement is a tooth cover fabric.

6. The elastomeric composite of claim 5 wherein the textile reinforcement is a helically wound tensile cord embedded in said belt.

7. The elastomeric composite of claim 1 wherein said graphene is present in the adhesive at a concentration in the range of about 0.05% to about 6.0% by weight on a dry solids basis.

8. The elastomeric composite of claim 1 wherein said graphene oxide is present in the adhesive at a concentration in the range of about 0.05% to about 6.0% by weight on a dry solids basis.

9. A textile reinforced elastomeric composite comprising a textile reinforcement embedded in an elastomeric matrix, said textile reinforcement comprising fibers and an adhesive treatment applied to said fibers wherein said adhesive treatment comprises graphene or graphene oxide; wherein the adhesive treatment is selected from the group consisting of an epoxy-latex treatment, a latex treatment, an RFL treatment, a rubber cement, and combinations thereof; and wherein the adhesive treatment contains no ionic polymers.

* * * * *